United States Patent [19]

Bollard et al.

[11] Patent Number: 4,845,495

[45] Date of Patent: Jul. 4, 1989

[54] INTEGRATED AVIONICS CONTROL AND DISPLAY ARRANGEMENT

[75] Inventors: Robert J. Bollard, Wayne; Martin Feintuch, Fort Lee; Robert J. Johnston, Maywood, all of N.J.

[73] Assignee: Allied-Signal Inc., Morris Township, Morris County, N.J.

[21] Appl. No.: 161,229

[22] Filed: Feb. 17, 1988

[63] Related U.S. Application Data
Continuation of Ser. No. 842.616, March 21, 1986

[51] Int. Cl.[4] .............................................. G01C 21/00
[52] U.S. Cl. ................................... 340/973; 340/945; 364/434; 364/424.06
[58] Field of Search ............... 340/971, 973, 711, 716, 340/945; 364/423, 424, 427, 428, 431.11, 431.12, 433, 434; 73/178 R; 244/1 R; 370/85

[56] References Cited

U.S. PATENT DOCUMENTS

| | | | |
|---|---|---|---|
| 4,155,116 | 5/1979 | Tawfik et al. | 364/424 |
| 4,163,387 | 8/1979 | Schroeder | 340/973 |
| 4,203,107 | 5/1980 | Lovercheck | 340/711 |
| 4,245,315 | 1/1981 | Barman et al. | 364/431.11 |
| 4,271,402 | 6/1981 | Kastura et al. | 364/431.11 |
| 4,371,870 | 2/1983 | Biferno | 340/716 |
| 4,463,355 | 7/1984 | Schultz et al. | 340/971 |
| 4,562,545 | 12/1985 | Hasegawa | 364/431.12 |
| 4,598,292 | 7/1986 | Devino | 340/971 |
| 4,604,711 | 8/1986 | Benn et al. | 364/424 |
| 4,622,667 | 11/1986 | Yount | 364/434 |

Primary Examiner—Joseph A. Orsino
Assistant Examiner—Brent A. Swarthout
Attorney, Agent, or Firm—Howard G. Massung

[57] ABSTRACT

An integrated avionics control and display arrangement is disclosed which combines symbol generation, display and mission processing, and multiplex bus control in a single processor configuration. The arrangement features "home" pages for primary parameter display with selectable additional pages available in conjunction with operator-operable keys disposed around the display. A wide variety of control signals compatible with the multiplex bus format are integrated directly with the bus, and a wide variety of non-compatible signals are integrated with the bus through remote terminal units which are arranged in a redundant configuration for system failure survivability and enhanced interconnect wiring economy.

8 Claims, 2 Drawing Sheets

INTEGRATED AVIONICS CONTROL AND DISPLAY ARRANGEMENT

This application is a continuation of application Ser. No. 842,616 filed Mar. 21, 1986.

BACKGROUND OF THE INVENTION

It is advantageous for aircraft such as helicopters, for example to achieve total avionics systems control from a front and center instrument panel and console. This eliminates overhead and/or side instrument panels and provides an integrated arrangement for automated systems management, systems monitoring and status reporting for all of the avionics functions involved.

In an integrated arrangement as described, it is desirable to include multifunction indications or displays with "home" pages for primary parameter display, but with selectable additional pages for use in conjunction with keys disposed around the display for avionics control and management.

Moreover it is desirable to incorporate a wide scope of pilot assist functions into a single integrated arrangement for pilot convenience.

Further, for reasons of simplifying hardware implementations, it is frequently desirable to combine symbol generation, display and mission processing with multiplex bus control in a single processing arrangement. The use of multiplex bus communication between elements of the system also provides implementation economy over conventional distributed interconnection wiring.

Finally for system failure survivability, functional redundancy and means for system reversion must be maintained.

Such organization of the controls and displays, and the extensive use of cockpit automation, is especially useful in reducing crew workload when the nature of a mission and the operation of the mission equipment is time consuming of the crew, or when a goal is to reduce the number of crew members.

Accordingly, it is the object of this invention to accommodate the above features by providing a novel arrangement including, in combination, a multiplex bus and associated control and display means, to provide an integrated control and display arrangement for avionics system management.

SUMMARY OF THE INVENTION

This invention contemplates an integrated avionics control and display arrangement including a multiplex bus. The multiplex bus establishes communication between elements of the system permitting exchange of data between the elements, and allowing centralized control from the cockpit controls and displays of all of the bus-connected avionics systems elements.

Avionics systems so controlled may include navigational/communication radios; attitute heading reference and Doppler radar systems for navigation; and friend/foe identification systems for military purposes, and which systems provide signals in the multiplex bus format.

Aircraft systems so controlled may include aircraft fuel and lighting systems, and which systems provide signals not in the multiplex bus format. In this case interface conversion means are utilized for conditioning the signals to the bus format and are arranged in an aircraft fore and aft redundancy configuration for system failure survivability and interconnect wiring economy.

The control and display arrangement features a centralized display of engine parameters, cautions and warnings, and current and future aircraft systems status, while providing, from the same centralized display, avionics systems and aircraft systems control functions. This is achieved by using a multiple page hierarchy of formats, with a "home" page display for the primary parameters.

DETAILED DESCRIPTION OF THE INVENTION

Figure 1:
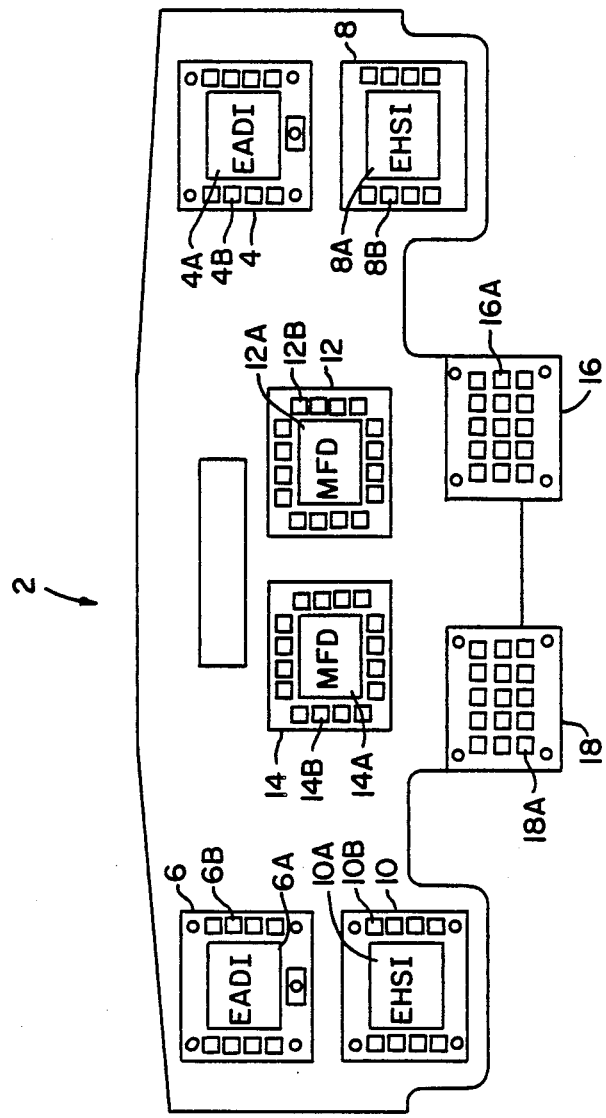
FIG. 1 is a diagrammatic representation illustrating an instrument panel resulting from an implementation of the invention.

FIG. 1 shows an instrument panel designated generally by the numeral 2, and of the type used for controlling an aircraft such as, for example, a helicopter.

Instrument panel 2 includes a pair of electronic attitude/director indicators (EADI) designated by the numerals 4 and 6 and disposed at either end of the panel. Indicators 4 and 6 are of the type including cathode ray tube (CRT) display screens 4A and 6A, respectively, and operator-operable fixed function keys 4B and 6B, respectively.

A pair of electronic horizontal situation indicators (EHSI) designated by the numerals 8 and 10 are disposed beneath indicators 4 and 6, respectively. Indicators 8 and 10 are of the type including RT display screens 8A and 10A, respectively, and operator-operable fixed function keys 8B and 10B, respectively.

Indicators 4 and 6 may provide monochromatic attitude/director CRT displays and indicators 8 and 10 may provide monochromatic horizontal situation CRT displays. Indicators of the type described are well known in the art and need not be further described for purposes of the present invention.

The upper center section of instrument panel 2 includes a pair of multifunction displays (MFD) designated by the numerals 12 and 14. Displays 12 and 14 are of the type including CRT display screens 12A and 14A, respectively, and operator-operable fixed function and line select keys 12B and 14B, respectively. Displays 12 and 14 provide color displays of a variety of functions (multifunction) to assist in the control and monitoring of the aircraft subsystems and avionics equipment. Displays 12 and 14 are also of the type well known in the art and, likewise, no further explanation of said displays is considered necessary for purposes of the present invention.

A pair of keyboards designated by the numerals 16 and 18 are disposed in the lower center section of instrument panel 2 and include operator-operable line select keys 16A and 18A, respectively.

Figure 2:
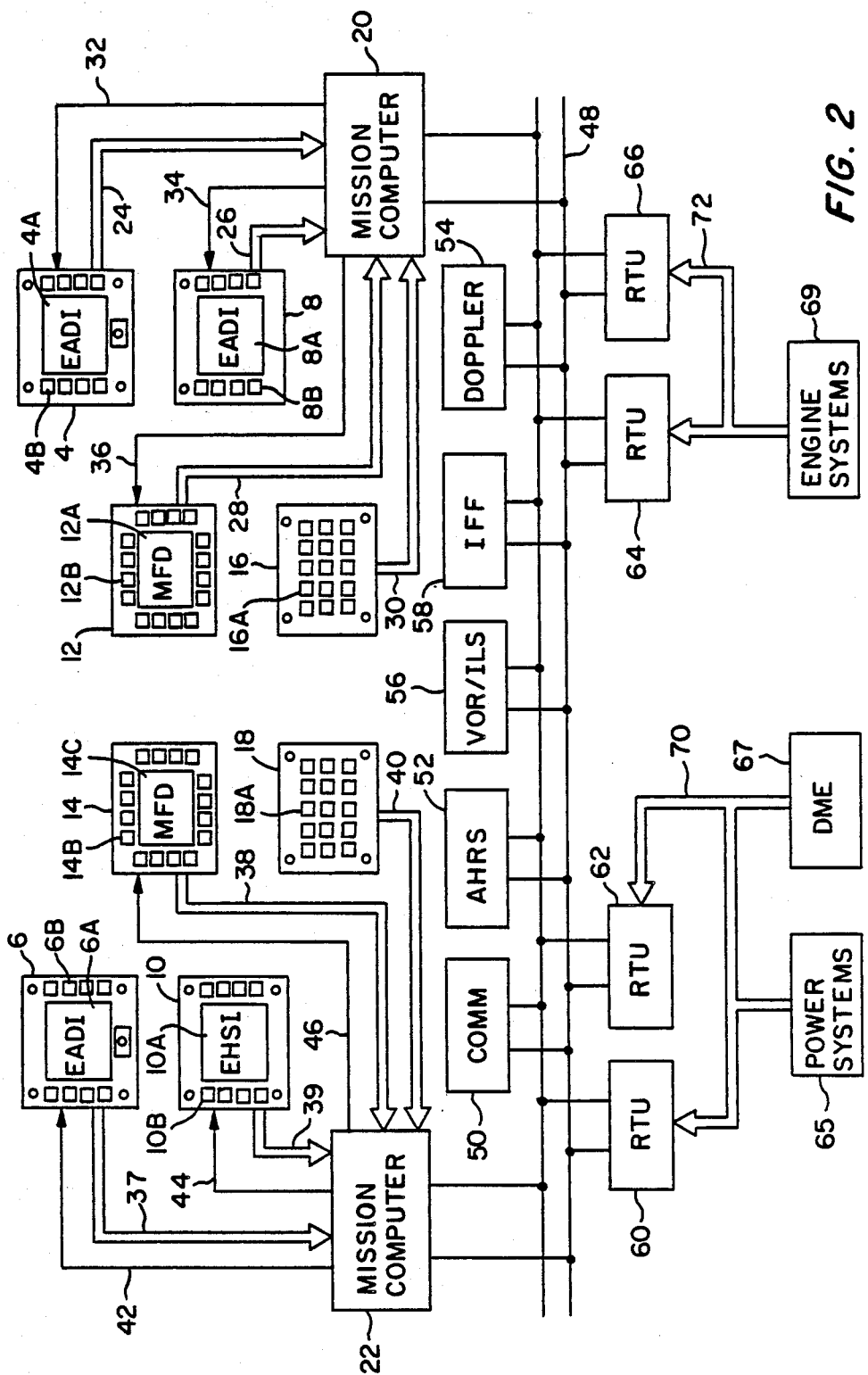
FIG. 2 is a block diagram illustrating the architecture of the invention.

With reference to FIG. 2, a pair of mission computers are designated by the numerals 20 and 22. Mission computers 20 and 22 are of the conventional type including microprocessors and symbol generators (not otherwise shown). Indicators 4 and 8 communicate with mission computer 20 through buses 24 and 26, respectively; display 12 communicates with computer 20 through a bus 28; and keyboard 16 communicates with computer 20 through a bus 30. Computer 20 drives indicators 4 and 8 and display 12 through connectors 32, 34 and 36, respectively.

Indicators 6 and 10 communicate with mission computer 22 through buses 37 and 39, respectively; display 14 communicates with computer 22 through a bus 38; and keyboard 18 communicates with computer 22 through a bus 40. Computer 22 drives indicators 6 and 10 and display 14 through connectors 42, 44 and 46, respectively.

An input/output multiplex bus is designated by the numeral 48. Input/output bus 48 may be, for purposes of illustration, a military (MIL) standard 1553 multiplex bus as will be recognized by those skilled in the art. Bus 48 communicates with mission computers 20 and 22.

It will be recognized that the components of the invention so far described have been arranged in a redundant pair. Thus, mission computer 20, indicators 4 and 8, display 12 and keyboard 16 provide one half of the redundant pair, and mission computer 22, indicators 6 and 10, display 14 and keyboard 18 provide the other half of the redundant pair.

Various avionics systems which provide signals in a format compatible with the format of multiplex bus 48 communicate with the bus, with computers 20 and 22 driving the aforenoted indicators and displays to provide a "home" page display of the parameters represented by said signals. These avionics systems may include, for purposes of example, a communications radio system (COMM) 50; an attitude heading reference system (AHRS) 52; a Doppler radar system 54; and a visual omnirange/instrument landing system (VOR/ILS) 56. Systems 50, 52, 54 and 56 are used for navigational purposes. An indemnification friend/foe system (IFF) 58 may be used for military identification purposes. Systems 50, 52 54, 56 and 58 are of the type well known in the art and further explanation of their operation is not considered necessary for purposes of the invention.

In addition to providing the aforenoted "home" page display, additional selectable display pages are provided via the aforenoted operator-operable fixed function and line select keys, with communication thereupon being effected between the corresponding indicators, displays, keyboards and computers through the respective communicating buses 24, 26, 28 and 30, as the case may be.

While the aforenoted avionics systems are compatible with the format of multiplex bus 48 as heretofore noted and may be thus easily integrated into the described multiplex bus system, a wide variety of basic aircraft signals are not available in the multiplex bus format. In order to accommodate this situation, centers for interface conversion, hereinafter referred to as remote terminal units (RTU) are utilized. Partition of these units into aircraft fore and aft pairs enhance system failure survivability and reduction of conventional aircraft wiring lengths. Processors included in these units not only accomplish the necessary signal conditioning for multiplex bus compatibility, but also strategically locate spare algorithm processing capability where flight control functions, navigation functions, checklist management and modes for built-in testing may be most easily accommodated, as will now be understood.

In consideration of the above, and with continued reference to FIG. 2, a pair of aircraft fore remote terminal units (RTU) 60 and 62 and a pair of aircraft aft remote terminal units (RTU) 64 and 66 communicate with multiplex bus 48. Remote terminal units (RTU's) 60, 62, 64 and 66 are centers for interface conversion, i.e. signal conditioning, to the format of multiplex bus 48 of aircraft systems relating, for example, to the aircraft electrical and hydraulic power systems 65; distance measuring equipment (DME) 67; and aircraft engine systems 69 communicating with the RTU's through buses 70 and 72 as shown in FIG. 2. The RTU's integrate the aircraft systems signals into the multiplex bus system format for application to computers 20 and 22 and therefrom to displays 12 and 14, as the case may be, for "home" page display and for the additional selectable display pages as aforenoted.

It will now be seen from the aforegoing description of the invention that multifunction displays with "home" pages for primary parameter display are provided, with selectable additional pages being provided in conjunction with fixed function and line select keys disposed around the display for avionics control and management, as the case may be.

With the arrangement shown combined symbol generation, display and mission processing, and multiplex bus control are available in a single processing arrangement.

Grouping of the remote terminal units (RTU's into aircraft fore and aft redundant pairs enhance system failure survivability and enhance interconnect wiring economy.

It will now be understood that the arrangement described provides an enlarged scope of pilot assist functions incorporated into a single integrated system for pilot convenience. Further, a performance management capability for both current sensed and future conditions as requested by the pilot of the aircraft via select keys is available.

With the above description of the invention in mind, reference is made to the claims appended hereto for a definition or the scope of the invention.

What is claimed is:

1. An integrated control and display arrangement including signal conditioning and processing means for avionics system management of an aircraft, characterized by:
    an input/output multiplex bus having a predetermined format;
    a first plurality of means, each of which means provides an aircraft control signal so that a first plurality of aircraft control signals are provided; said signals being in a predetermined format compatible with the predetermined multiplex bus format, said first plurality of means communication with the multiplex bus for applying said signals thereto;
    a second plurality of means providing a corresponding second plurality of aircraft control signals, said signals being in a format other than the multiplex bus format;
    means communicating with the second plurality of means and receiving the second plurality of signals for conditioning said signals so that said signals are in a predetermined format compatible with the predetermined multiplex bus format, and communicating with the multiplex bus for applying the conditioned second plurality of signals thereto;
    processing means communicating with the multiplex bus and receiving the first plurality of signals and the conditioned second plurality of signals for processing the received signals and for providing processed signals; and
    display means connected to the processing means and responsive to the processed signals for displaying the control status of the aircraft, wherein the means communicating with the second plurality of means and receiving the second plurality of signals for conditioning said signals so that said signals are in a predetermined format compatible with the multiplex bus format, and communicating with the multiples bus for applying the conditioned second plurality of signals thereto, is characterized by:
   a first pair of redundant terminal means disposed in the fore section of the aircraft for receiving first signals of the second plurality of signals; and
   a second pair of redundant terminal means disposed in the aft section of the aircraft for receiving second signals of the second plurality of signals.

2. An arrangement as described by claim 1, further characterized by:
   operator-operable means associated with the display means and communicating with the processing means, and operable for applying signals to the processing means in accordance with an operator selected aircraft control status;
   the processing means responsive to the signals in accordance with the selected aircraft control status for processing said signals and for providing processed selected aircraft control signals; and
   the display means responsive to the processed selected aircraft control signals for displaying the selected aircraft control status.

3. An arrangement as described by claim 1, further characterized by:
   the display means including a first display arrangement and a second redundant display arrangement;
   the processing means including a first processor and a second redundant processor; and
   the first display arrangement connected to the first processor and the second display arrangement connected to the second processor.

4. An arrangement as described by claim 3, further characterized by:
   the first display arrangement and the redundant second display arrangement each including a plurality of single function displays, each of which displays a particular aircraft control status, and a multifunction display for displaying multiple aircraft control statuses.

5. An arrangement as described by claim 2, further characterized by:
   the display means including a first display arrangement and a second redundant display arrangement;
   the first display arrangement and the second redundant display arrangement each including a plurality of single function displays, each of which displays a particular aircraft control status, and a multifunction display for displaying multiple aircraft control statuses; and
   the operator-operable means associated with the display means and communicating with the processing means and operable for applying signals to the processing means in accordance with a selected aircraft control status includes first keys corresponding to each of the plurality of single function displays, and second keys corresponding to each of the multifunction displays.

6. An arrangement as described by claim 5, wherein the operator-operable means is further characterized by:
   a first keyboard arranged with the first display arrangement and a second redundant keyboard arranged with the second display arrangement; and
   the first and second keyboards having third keys and fourth keys.

7. An arrangement as described by claim 2, characterized by:
   the operator-operable means associated with the display means and communicating with the processing means, and operable for applying signals to the processing means in accordance with a selected aircraft control status including a plurality of keys.

8. An arrangement as described by claim 3, characterized by:
   the first display arrangement and the second redundant display arrangement each including a plurality of cathode ray tube displays;
   the first processor and the second redundant processor each including a first mission computer having a microprocessor and a symbol generator;
   the first processor driving the plurality of cathode ray tube displays in the first display arrangement; and
   the second processor driving the plurality of cathode ray tube displays in the second display arrangement.

* * * * *